United States Patent
Gearhart et al.

(10) Patent No.: US 10,066,960 B2
(45) Date of Patent: Sep. 4, 2018

(54) SYSTEMS AND METHODS FOR USING ROUTE MATRICES FOR IDENTIFYING INTERSECTION POIS

(71) Applicant: MapQuest, Inc., Denver, CO (US)

(72) Inventors: G. Duane Gearhart, Hummelstown, PA (US); Gregory Knisely, Strasburg, PA (US); David W. Nesbitt, Port Deposit, MD (US)

(73) Assignee: Mapquest, Inc., Denver, CO (US)

( * ) Notice: Subject to any disclaimer, the term of this patent is extended or adjusted under 35 U.S.C. 154(b) by 285 days.

(21) Appl. No.: 15/168,994

(22) Filed: May 31, 2016

(65) Prior Publication Data

US 2016/0273936 A1 Sep. 22, 2016

Related U.S. Application Data

(63) Continuation of application No. 14/161,636, filed on Jan. 22, 2014, now Pat. No. 9,377,323.

(51) Int. Cl.
*G01C 21/34* (2006.01)
*G01C 21/00* (2006.01)
*G01C 21/36* (2006.01)

(52) U.S. Cl.
CPC ..... *G01C 21/3682* (2013.01); *G01C 21/3667* (2013.01); *G01C 21/3679* (2013.01); *G01C 21/00* (2013.01); *G01C 21/34* (2013.01)

(58) Field of Classification Search
CPC ............ G01C 21/3679; G01C 21/3682; G01C 21/3667; G01C 21/34; G01C 21/00
USPC .............. 701/540, 532, 416, 429, 468, 426; 340/990, 991, 992
See application file for complete search history.

(56) References Cited

U.S. PATENT DOCUMENTS

| | | | |
|---|---|---|---|
| 6,401,034 B1 | 6/2002 | Kaplan et al. | |
| 6,434,482 B1 | 8/2002 | Oshida et al. | |
| 6,542,812 B1 | 4/2003 | Obradovich et al. | |
| 8,239,130 B1 * | 8/2012 | Upstill | G01C 21/3679 701/400 |
| 8,433,512 B1 * | 4/2013 | Lopatenko | G01C 21/3679 701/400 |
| 8,566,029 B1 * | 10/2013 | Lopatenko | G08G 1/0962 701/426 |

(Continued)

OTHER PUBLICATIONS

A context-aware system for navigation and information dissemination on android devices Piyanuch Silapachote; Ananta Srisuphab; Rasita Satianrapapong; Warat Kaewpijit; Nuttaporn Waragulsiriwan 2013 IEEE International Conference of IEEE Region 10 (TENCON 2013) ; year 2013, pp. 1-4.*

(Continued)

*Primary Examiner* — Cuong H Nguyen

(57) ABSTRACT

Computer implemented methods are disclosed. The methods may include identifying a plurality of points of interest (POIs) within a pre-determined travel time from an intersection or highway exit and calculating a travel time and distance from the intersection or highway exit to each of the plurality of POIs. The methods may further include, associating each of the plurality of POIs with the intersection or highway exit, and storing the travel time and distance from the intersection or highway exit to each of the plurality of associated POIs in an electronic database as pre-calculated POI data.

20 Claims, 7 Drawing Sheets

(56) References Cited

U.S. PATENT DOCUMENTS

| | | | |
|---|---|---|---|
| 8,589,069 B1* | 11/2013 | Lehman | G01C 21/20 340/995.1 |
| 8,620,579 B1* | 12/2013 | Upstill | G01C 21/3679 701/400 |
| 8,762,053 B1* | 6/2014 | Lehman | G01C 21/20 340/995.1 |
| 8,953,838 B2 | 2/2015 | Chen | |
| 9,105,189 B2* | 8/2015 | Rubin | G08G 9/02 |
| 9,792,368 B1* | 10/2017 | Amacker | G06K 9/00671 |
| 2007/0203642 A1 | 8/2007 | Arnold-Huyser | |
| 2010/0088018 A1 | 4/2010 | Tsurotome et al. | |
| 2011/0098922 A1 | 4/2011 | Ibrahim | |
| 2012/0197713 A1 | 8/2012 | Stroila | |
| 2013/0073388 A1* | 3/2013 | Heath | G06Q 30/02 705/14.53 |
| 2013/0278441 A1* | 10/2013 | Rubin | G08G 9/02 340/905 |
| 2013/0278443 A1* | 10/2013 | Rubin | G08G 9/02 340/905 |
| 2013/0282271 A1* | 10/2013 | Rubin | G08G 9/02 701/423 |
| 2014/0005924 A1 | 1/2014 | Letz | |
| 2014/0006129 A1* | 1/2014 | Heath | G06Q 30/0222 705/14.23 |
| 2014/0129976 A1 | 5/2014 | Beaurepaire et al. | |
| 2014/0244143 A1 | 8/2014 | Elwart et al. | |
| 2015/0204688 A1* | 7/2015 | Gearhart | G01C 21/3679 701/540 |
| 2017/0279957 A1* | 9/2017 | Abramson et al. | H04M 1/72577 |
| 2017/0293950 A1* | 10/2017 | Rathod | G06Q 30/0283 |
| 2017/0337813 A1* | 11/2017 | Taylor | G08G 1/0141 |
| 2018/0067593 A1* | 3/2018 | Tiwari | G06F 3/048 |
| 2018/0102858 A1* | 4/2018 | Tiwari | H04B 17/19 |
| 2018/0121571 A1* | 5/2018 | Tiwari | G06F 17/5004 |

OTHER PUBLICATIONS

Travel Time Enabled Bus Route Navigation System Experiment in Beijing; Bo Liu; Wenjia Wang; 2007 IEEE Intelligent Transportation Systems Conference; Year: 2007; pp. 425-430.*

* cited by examiner

| EXIT/SERVICE AREA | | POI | CATEGORY | DISTANCE FROM EXIT RAMP (MILES) | DRIVE TIME FROM EXIT RAMP (MINS) |
|---|---|---|---|---|---|
| 10 | | MCDONALDS | FOOD | 0.7 | 3 |
| CONV. RATING | | SUBWAY | FOOD | 0.8 | 3 |
| | | EXXON | FUEL | 0.7 | 3 |
| | | BEST WESTERN | LODGING | 1.5 | 5 |
| 11 | | SHELL | FUEL | 1.2 | 5 |
| 13 | | BURGER KING | FOOD | 1.3 | 5 |
| CONV. RATING | 1/2 ★ | SHEETZ | FUEL | 1.7 | 6 |
| REST AREA | TN 15 | STARBUCKS | FOOD | .1 | >1 |
| CONV. RATING | 5 ★ | BP | FUEL | .1 | >1 |
| | | MCDONALDS | FOOD | .1 | 1 |
| | | PANERA | FOOD | .1 | 1 |
| | | DUNKIN DONUTS | FOOD | .1 | 2 |
| | | PET AREA | MISC. | .1 | 2 |
| 19 | | SUBWAY | FOOD | 1.7 | 7 |
| 23 | | EXXON | FUEL | 2.5 | 9 |
| 25 | | MCDONALDS | FOOD | 3.1 | 11 |

*FIG. 3*

SYSTEMS AND METHODS FOR USING ROUTE MATRICES FOR IDENTIFYING INTERSECTION POIS

CROSS-REFERENCE TO RELATED APPLICATIONS

This application is a continuation of pending U.S. application Ser. No. 14/161,636, filed on Jan. 22, 2014, which is incorporated herein by reference in its entirety.

TECHNICAL FIELD

Various embodiments of the present disclosure relate generally to providing geographical mapping information. More specifically, exemplary embodiments of the present disclosure relate to systems and methods for identifying points of interest (POI) information relative to intersections or highway exit locations and generating a database of intersections or highway exit locations with the identified POI information.

BACKGROUND

In recent years, the use of digital maps and mapping applications has grown significantly. Such mapping applications may be executable by various types of user electronic devices. Examples of such devices include, but are not limited to, a computer connected to the Internet, an onboard navigation system in a vehicle, a dedicated portable Global Positioning System (GPS) device, a mobile computer device (e.g. a smartphone), a GPS-enabled computing device, etc. The displayed digital maps often convey information related to roads, traffic, buildings, landmarks, terrain, and other geographic locations or regions of interest. Most digital maps allow users to view various portions of a map (e.g. scrolling around, zooming in and out, etc.).

Some digital maps may be interactive, receiving user inputs such as an input of a specific geographic location, to view a map of that location and the surrounding locations. Some mapping applications may also include route guidance features allowing users to receive route information or driving directions to a particular address based on each user's input of a location or detection of each user's current geographic location, as derived through GPS or other location detecting means.

Some digital maps may also provide information about various points of interest (POIs) at or near a location selected or specified by a user. A POI may be, for example, a specific business, destination, or attraction that is useful or interesting to an individual or a group of individuals, or that the individual or the group may want to visit. By way of example, POIs on a digital map may represent gas stations, rest areas, hotels, restaurants, museums, hospitals, historical sites, houses for sale, etc., and/or any other site in a specific geographic area. A POI may also correspond to a consumer retail location, such as a movie theater showing a particular film, a restaurant that serves a specific type of food, such as pizza, etc.

Digital maps, either interactive or non-interactive, may be used for planning or taking a trip. Such trips may be to the same location (e.g., daily commuting between home and work), new short-distance trips to unfamiliar locations, long-distance vacation road-trips, or any other type of travel. For example, a user may use a digital mapping application executable at the user's device to input origin and destination locations and obtain routing directions to and from the locations. Mapping service providers also may track a user's location using GPS or other location detecting means coupled to a user's electronic device. Based on this location information, the digital maps may provide users with real-time information, such as live traffic information. The digital maps also may provide dynamic routing adjustments for a predetermined or prescribed route of travel when the location of the user's device is tracked.

However, conventional mapping applications or services do not provide advance identification and association of POIs with particular road intersections, such as local intersections and highway exit locations. This may cause users to expend excessive time and effort in locating POIs.

SUMMARY OF THE DISCLOSURE

Accordingly, a need exists for methods, systems, and devices that identify and display POIs associated with intersections along a route to optimize travel.

According to certain embodiments, computer-implemented methods are disclosed, the method may include: identifying a plurality of points of interest (POIs) within a pre-determined travel time from an intersection or highway exit, calculating a travel time and distance from the intersection or highway exit to each of the plurality of POIs, associating each of the plurality of POIs with the intersection or highway exit, and storing the travel time and distance from the intersection or highway exit to each of the plurality of associated POIs in an electronic database as pre-calculated POI data.

Aspects of the disclosure relate to one or more of: receiving, from a user's electronic device and over a network, user input data including at least a destination location, generating a route from a start location to the destination location on a digital map based on the user input data, at least a portion of the route comprising one or more intersections or highways, retrieving, from the electronic database, the pre-calculated POI data, displaying, on the user's electronic device, the route, and the pre-calculated POI data; determining one or more attributes of the intersection or highway exit; wherein the one or more attributes of the intersection or highway exit comprises the type of intersection or highway exit; wherein the intersection or highway exit is a plurality intersections or highway exits, and each of the plurality of POIs is associated with a single one of the plurality of intersections or highway exits; comprising determining a rating for each of the plurality of intersections or highway exits; the rating is based on a shortest travel time from each of the plurality of associated POIs to each of the plurality of intersections or highway exits; determining a POI category for each of the plurality of POIs, associating the POI category in the electronic database, and determining a rating of the intersection or highway exit based on the number of different POI categories for the intersection or highway exit; wherein the rating is further determined based on user submitted ratings; wherein the user input data comprises one or more POI categories; wherein the pre-determined travel time is received from a user; updating the electronic database based on the travel time and the distance from the intersection or highway exit to each of the plurality of POIs; a step of dynamically receiving data related to each of the associated POIs; wherein the electronic database comprises the data related to each of the associated POIs; and/or wherein the data is selected from the group consisting of: fuel prices, and hotel room rates.

According to certain embodiments, computer-implemented methods are disclosed for providing point of interest (POI) information to a user, the method including: identifying a plurality of points of interest (POIs) within a pre-determined travel time from a plurality of intersections or highway exits, calculating a travel time and distance from each of the plurality of intersections or highway exits to each of the plurality of POIs, associating each of the plurality of POIs with each of the plurality of intersections or highways, storing the travel time and distance from the each intersection or highway exit to each of the plurality of POIs in an electronic database, as pre-calculated POI data, and retrieving, from the electronic database, the stored pre-calculated POI data, in response to a user request.

According to another embodiment, computer systems are provided for providing to a user information relating to a trip from a start location to a destination location. Certain systems may include: a memory having processor-readable instructions stored therein; and a processor configured to access the memory and execute the processor-readable instructions, which when executed by the processor configure the processor to perform a plurality of functions, including functions to: identify a plurality of points of interest (POIs) within a pre-determined travel time from an intersection or highway exit, calculate a travel time and distance from the intersection or highway exit to each of the plurality of POIs, associate each of the plurality of POIs with the intersection or highway, and store the travel time and distance from the intersection or highway exit to each of the plurality of POIs in an electronic database, as pre-calculated POI data.

The disclosed embodiments achieve convenient trip planning by determining POIs along a route, associating the POIs with intersections, or highway exits, and presenting customized routes based, in part, on the POIs associated with the intersections or highway exits.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a diagram illustrating a table of POIs and intersections or highway exits along a route, according to an exemplary embodiment of the present disclosure.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for generating a database of POI data associated with one or more intersections or highway exits based, in part, on the travel time and distance from a POI to an intersection or highway exit. The database of POI data may be saved in memory and be accessed by users, for example, in trip planning. For purposes of illustration, if a user electronically inputs start and destination locations, then the POI database may be accessed, the pre-calculated POI data may be retrieved, and the user may be electronically presented with a route with POIs associated with exit locations along the route and directions from the start location to the destination location and the associated POIs along the route.

The present disclosure also describes methods and systems for dynamically identifying POIs and associating POIs with intersection and/or exit locations along a route and automatically calculating exit rating based on the various attributes of the exits and POIs associated with the exits. In this manner, the user may efficiently plan a customized trip.

Figure 1:
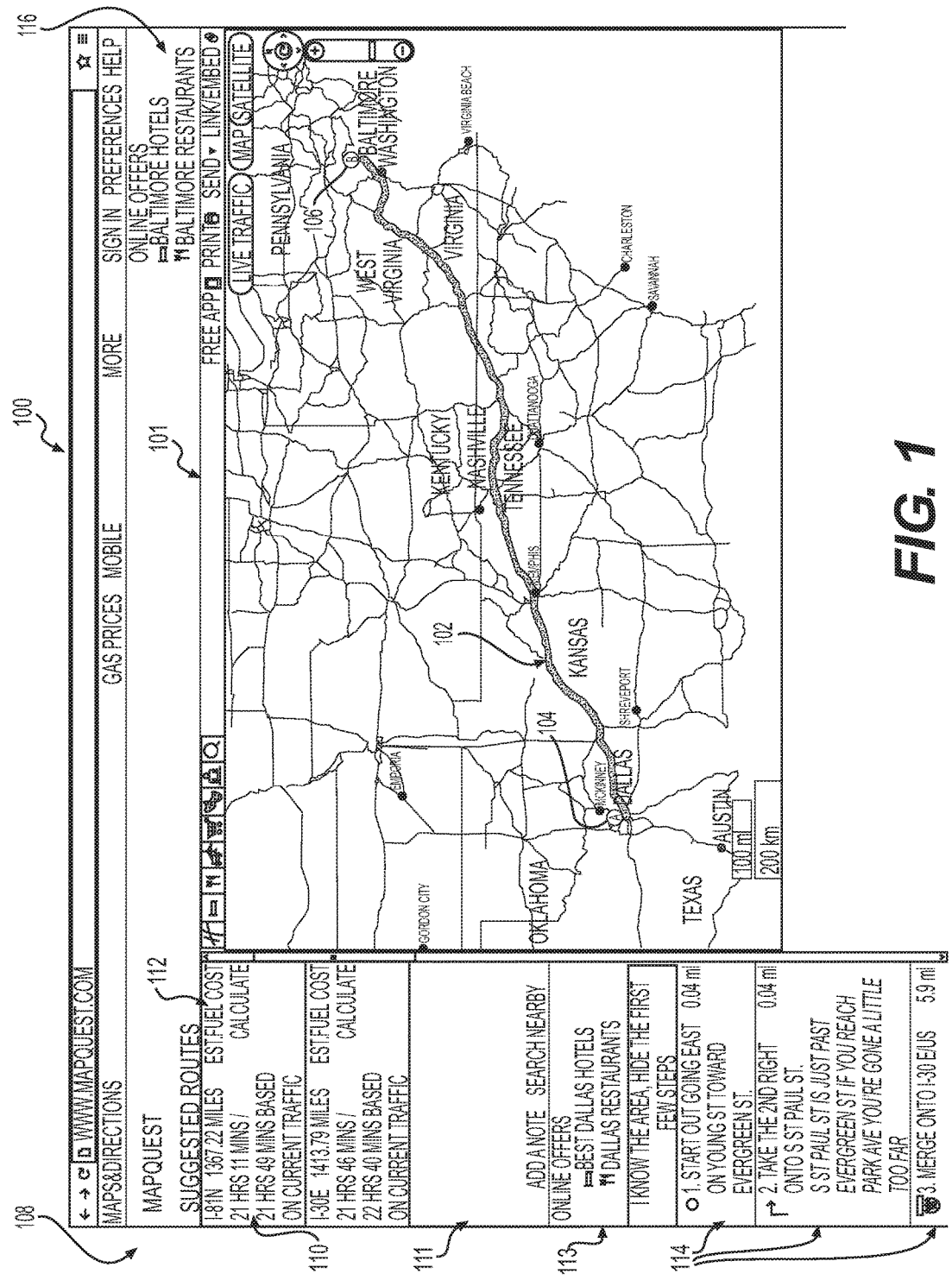
FIG. 1 is a schematic view of an exemplary graphical user interface (GUI) of a trip planner, a route on a digital map, and information pertaining to the route, according to an exemplary embodiment of the present disclosure.

Referring now to the figures, FIG. 1 is a schematic view of an exemplary GUI 100 including a graphical representation of a digital map 101 with a route 102 between a start location 104 and a destination location 106 which may access and retrieve pre-calculated POI data associated with an intersection or highway exit. The digital map 101 may include various geographic information represented in any suitable manner, such as text, symbols, borders, etc. The GUI 100 may be provided by a mapping service provider or any other entity.

The digital map 101 may be of any suitable form and/or type of view, such as a map view, satellite view, live traffic view, etc. The digital map 101 may be any suitable size to be displayed by an electronic device and its view may be manipulated, (e.g., zoomed in and out, rotated, etc.). The digital map 101 may be of any scale, e.g. transcontinental, continental, region, state, city, neighborhood, campus, etc. The digital map 101 also may include various identifiers, e.g. geographic markers landmarks, road names, etc. and may be automatically electronically updated.

In some embodiments, the GUI 100 may be accessible (e.g., for viewing and interacting) on a website accessible by an electronic device. In other embodiments, the GUI 100 may be accessible on a mobile navigation application of an electronic device. In such embodiments, the view of the digital map 101 may be automatically updated or panned over based on detecting, via GPS or in any other suitable manner, the current location of the electronic device.

The GUI 100 also may include an external content portion 116 and also may include a route information portion 108 having a route summary portion 110, a user inputted notes portion 111, an estimated fuel cost portion 112, an external content portion 113, a detailed directions portion 114, and any other portion for displaying suitable information. The external content portions 113 and 116 may include content, such as electronic advertisements received from an external content or ad server based on the route, user demographics, etc.

The route summary portion 110 may include a summary of the primary highway or highways on a route, the estimated travel time, estimated travel time based on current traffic, and/or any other suitable route information. The route summary portion 110 also may include summaries of alternative routes along with estimated travel times, estimated travel time based on current traffic, and/or any other suitable information.

The estimated fuel cost portion 112 may be selected by the user in any suitable manner (e.g. via touchscreen selection, selection using a mouse, etc.) and the user may be prompted to input further information for use in calculating the estimated fuel cost. Such further information may include vehicle type, type of fuel used, etc. In some embodiments, information about the vehicle may be automatically retrieved, such as by an in-vehicle GPS device. The estimated fuel cost may be displayed in the estimated fuel cost portion 112 and/or another screen in relation to each possible route suggested in the route summary portion 110. The route information portion 108 also may include a portion for a user to add notes or other information. In addition, the route information portion 108 may include a selectable portion for prompting the user to search for various locations/entities along and/or near the route.

The detailed directions portion 114 may include step-by-step directions of the route and any suitable information regarding the route, such as distance/travel time to and from the start location, next portion or "leg" of the route, and/or the destination location. The detailed directions portion 114 also may include total travel time remaining and/or completed and may include icons, symbols, and/or images of route markers, such as symbols for interstate highways.

Each of the digital map 101 and route information portion 108 (and portion thereof) may be positioned in any suitable manner on the GUI 100 and may be enlarged, reduced, or minimized by the user using any suitable user interaction tools (e.g. mouse, touchscreen, keyboard, stylus, etc.) In addition to the size and zoom level of the portions being manipulated, portions of the GUI 100 may be selected to receive additional data. For example, the fuel cost display portion 112 may be selected by the user, (e.g. using the touchscreen, or mouse) to receive dynamically updated fuel cost estimates. The additional data may be displayed within any portion of the GUI 100. The GUI 100 may use any suitable graphical display and may be displayed on various electronic displays, such as monitors, mobile phones, tablets, etc., and a view of the digital map 101 and other portions of the GUI 100 may be printed. The information in the route information portion 108 also may be transmitted via an audio transmitter, such as a vehicle audio system.

Figure 2:
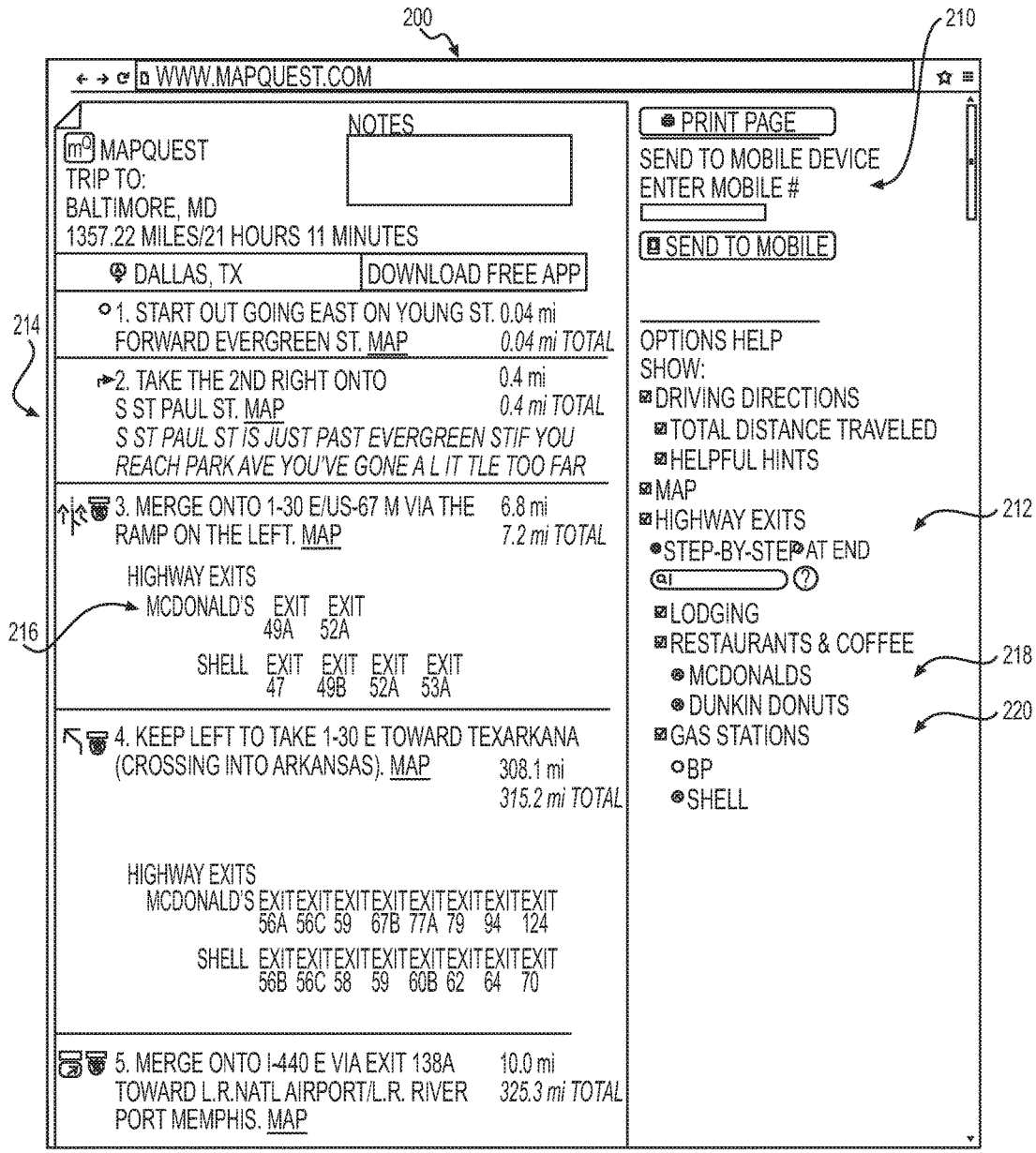
FIG. 2 is a schematic view of an exemplary POI information display portion of the GUI of FIG. 1, according to an exemplary embodiment of the present disclosure.

FIG. 2 is a schematic view of an exemplary POI information display portion 200 of GUI 100. The POI information display portion 200 may be displayed on the same screen as the digital map 101 and the route information portion 108, or in a separate screen, such as a print preview screen. In some embodiments, the GUI 100 may be on an application on a mobile device and the POI information display portion may be displayed in response to the current location of the mobile device (e.g. identified via GPS, etc.).

The POI information display portion 200 may include any suitable information relevant to the route and may be based on information provided by the user. For example, the POI information display portion 200 may include an input portion 210 for receiving information from the user and the information displayed may be customized based on the information submitted by the user and displayed in a POI display portion 214.

The input portion 210 may be configured to allow the user to input information in any suitable manner, for example, via a touchscreen, mouse, keyboard, etc. The input portion 210 may include various user elements into which the user may submit information, such as options to select what information 212 is displayed, such as which categories of POIs 218, and/or specific POIs or brands of POIs 220 along the route are displayed. Alternatively, the information display portion 200 may display route information based on predetermined parameters set by the mapping service providing the GUI 100, without the use of additional information provided by the user.

As shown in FIG. 2, the user may select (e.g. by selecting a box) which information should be displayed, for example on the GUI 100 and/or for printing. For example, the user may select whether or not to display the driving directions, total distance travelled, any helpful hints, the map, intersections, highway exits, how the directions are displayed, categories of POIs, brands/chains of POIs, and/or specific POIs by intersections or highway exits, etc. Examples of categories of POIs may include food, fuel, lodging, recreation, historical sites, etc.

Based on the information submitted by the user in the input portion 210, the pre-calculated POI data may be accessed and filtered, and may be displayed in the POI information display portion 214. For example, as shown in FIG. 2, information display portion 216 may display an intersection or highway exit in the step-by-step directions portion of the POI display portion 200 along with corresponding associated POIs selected or requested by the user in the input portion 210. Additional information related to the POIs displayed in the POI information display portion 214 may be displayed on the GUI 100, for example, by the user selecting the POI displayed in the POI information display portion 214. For example, a user may select a gas station displayed in the POI information display portion to be shown, along with current fuel prices, available amenities, (e.g. air pump, car wash, mechanic services, café, bathroom, etc.), phone number, etc. In this manner, the pre-calculated POI data may be filtered and displayed in accordance with the user's selections.

The POI information display portion 214 may also display a rating, such as a convenience rating for each exit along the route so that the user may plan which exits to take along the route based on the rating.

FIG. 3 is an illustration of a table 300 of POIs about an exit 302. The table includes a matrix 305 for each exit 302. Each matrix 305 may include pre-calculated information about POIs with a pre-determined distance/travel time of the exit. In this manner, each matrix 305 includes a single intersection/exit and one or more POIs associated with the single intersection/exit. For example, each matrix may include distance from the intersection/exit ramp to the POI and the travel time (e.g. drive time) from the intersection/ exit ramp to the POI. The distance may be measured using any suitable method or combination of methods (e.g. distance as the crow flies, distance along road). The travel time may be calculated based on past real-time measure(s) of time, speed restrictions, number of stops, turns, type or road, etc. In some embodiments, the table 300 may be saved in memory of the server(s) processing the mapping service. The table 300 may be used to populate the POI information display portion 214 and may not be displayed via the GUI 100 to the user. Alternatively, the table 300 may be displayed to the user on the GUI 100 in any suitable manner.

The table 300 having matrices 305 may include various columns and row of displaying various attributes of POIs associated with exit locations and may be arranged in any suitable manner. For example, the table 300 may include columns for exit/service area number 302, POI name 304, category of POI 306, distance from exit ramp 308, travel time from exit ramp 309, and/or any other relevant POI parameter. The columns and rows of the table 300 may be interactive and may be re-organized and manipulated by the user or administrator of the mapping service in any suitable manner.

The POI table 300 also may include ratings 310 for each exit. The ratings may be based on any suitable criteria from any suitable source(s). In some embodiments, the ratings 310 may be based on reviews submitted by other users of the mapping service or other entity, and/or based on a convenience rating calculated using an algorithm. For example, Convenience Rating=(1/travel time to associated POIs from exit location)+(x·number of different categories of POIs associated with exit)+(1/travel time from POI to on ramp). The ratings may be displayed using any scale and/or symbols (e.g. letters, stars, bars, etc.) In one embodiment, the convenience rating may be based on the number of different categories of POIs and respective distances of the POIs from the exit. For example, as shown in FIG. 3, the convenience of a rest area having multiple POIs in multiple different POI categories may receive a convenience rating of 5 stars, whereas exits having a single POI at a long distance from the exit location may receive a low or no convenience rating.

Figure 4:
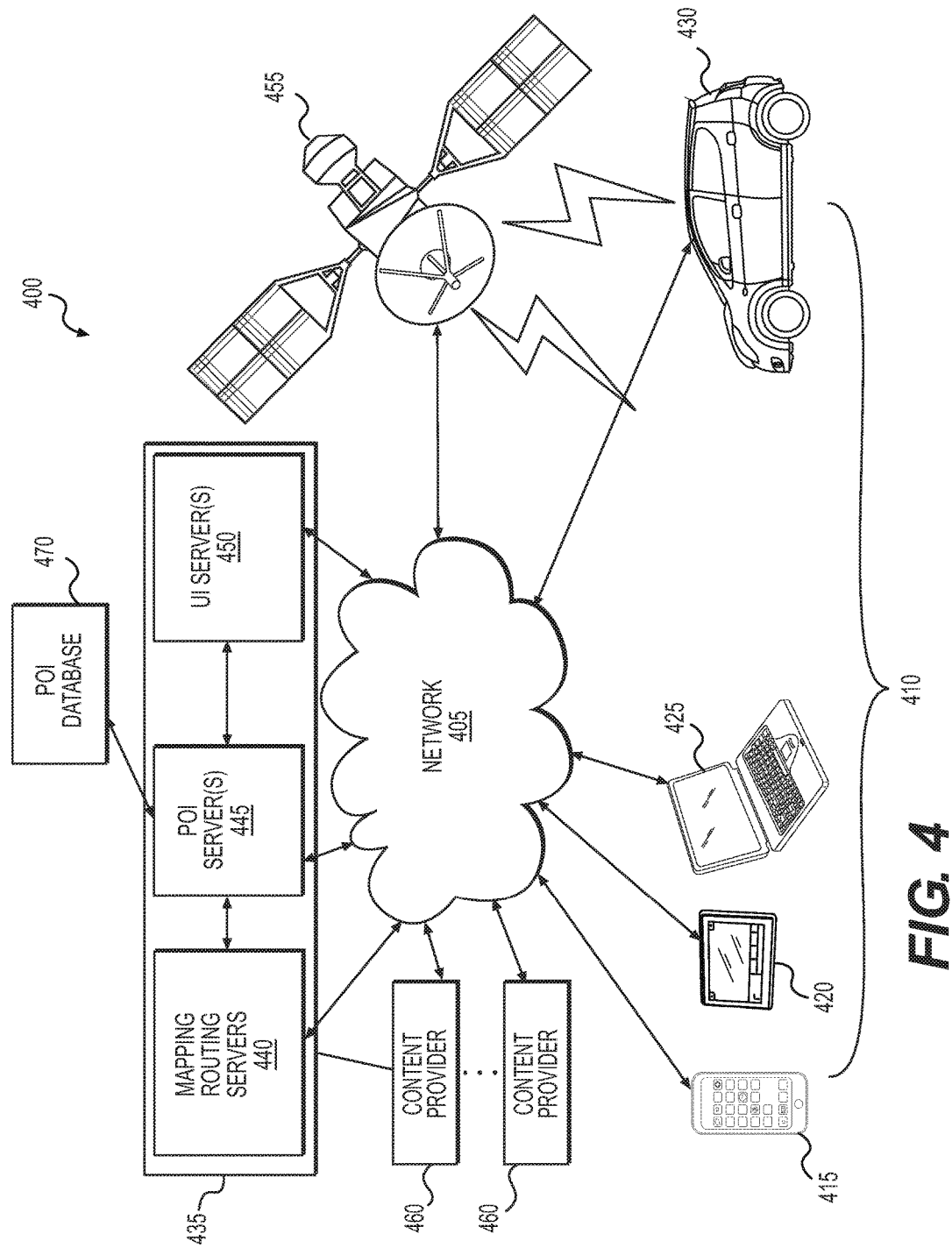
FIG. 4 is a block diagram of a communications system configured to present users with automatically generated dynamic routes with POI information associated with exits along the route, according to an exemplary embodiment of the present disclosure.

FIG. 4 is a block diagram of a communications system 400 capable of accessing stored POI data associated with intersections or exit locations. For example, the system 400 may access and retrieve the POI data stored on POI database 470 via a network 405, such as the Internet. The retrieved pre-calculated POI data may be used for display and/or processing by one or more user devices 410, such as a mobile device 415 (e.g., mobile phone, personal digital assistant, tablet computer), a GPS device 420, a computer (laptop, desktop, tablet) 425, in-vehicle navigation system 430, and/or any device connected to a network 405, such as the Internet, according to an exemplary embodiment of the present disclosure.

In the example shown in FIG. 4, mobile electronic device 415 may be a smartphone, a personal digital assistant ("PDA"), a tablet computer, or other type of mobile computing device, such as a device having a touchscreen display. Mobile device 415 and computer 425 may each be equipped with or include, for example, a GPS receiver for obtaining and reporting location information, e.g., GPS data, via network 405 to and from any of servers 435 and/or one or more GPS satellites 455. GPS device 420 may be a dedicated GPS navigation device having an integrated GPS receiver for exchanging location information with GPS satellite(s) 455 for purposes of tracking a current geographic location of GPS device 420 and its user. GPS device 420 may be a portable or handheld GPS device. Vehicle navigation system 430 may be implemented as, for example, a GPS based in-dash navigation system integrated with the vehicle 430. Such an in-dash navigation system may provide various functions, including a navigation function, via a center console display installed within the vehicle.

However, it should be noted that each of user devices 410, including mobile device 415, GPS device 420, computer 425, and/or vehicle navigation system 430, may be implemented using any type of electronic device configured to send and receive data, including location data (e.g., in the form of latitude and longitude coordinates), to and from a system of servers 435 over network 405. The user input device(s) may include any type or combination of input/output devices, such as a display monitor, touchpad, touchscreen, microphone, camera, keyboard, and/or mouse.

Furthermore, it should be noted that any of various techniques may be used to derive geographic location information for any of user devices 410, particularly in cases where GPS data may not be available, for example, in urban canyons or other locations where line-of-sight to GPS satellites may not be feasible. Examples of other techniques that may be used for deriving location information for any of user devices 410 include, but are not limited to, cell identification (e.g., using Cell ID), cellular tower triangulation, multilateration, Wi-Fi, or any other network or handset based technique for deriving location information for a mobile device. The various user devices 410 may also communicate with each other by any suitable means (e.g., via Wi-Fi, radio frequency (RF), infrared (IR), Bluetooth, Near Field Communication, or any other suitable means) to send and receive location and other information. For example, a mobile device 415 may communicate with GPS device 420 or vehicle navigation system 430.

The user device 410 may receive information via the network 405 from the system of servers 435, having one or more servers such as mapping/routing servers 440, POI servers 445, user interface servers 450, and/or any other suitable servers. Each server may access the POI database 470 to retrieve POI data, such as the data in each of the matrices 305. Each server may include memory, a processor, and/or a database. For example, the mapping server 440 may have a processor configured to retrieve mapping information and generate routing information, POI server 445 may have database that is a subset of POI database 470, and a processor configured to retrieve POI information, provide POI information, associate POIs with an exit location, and calculate ratings (e.g. convenience ratings) for each exit. The user interface server 450 may be configured to receive and process user input, such as POI preferences. The satellite 455 may be configured to send and receive location and other information to the server system 435 and user devices 410.

The various user devices 410 may communicate with each other by any suitable means (e.g., via the network 405, Bluetooth, Near Field Communication, or any other suitable means) to send and receive location and other information. For example, a mobile device 415 may communicate with a GPS device 420, 430 in communication with the satellite 455.

The mapping server 440 may receive information regarding a user's trip, such as a start location, destination location, and any user route preferences directly from the user device 410 via the network 405 or indirectly via the user interface server 450. The mapping server 440 may save the information in memory, such as a computer readable memory.

The mapping server 440 also may be in communication with one or more other servers, such as the POI server 445 and/or external servers such as servers of content providers 460. The content providers 460 may include advertisers, news sources, entities affiliated with POIs (e.g. ad agents, marketers), review sites, etc. In one embodiment, the content provider 460 may be a gas station owner providing advertisements and information regarding fuel prices for gas stations along the route. In other embodiments, the content provider may be restaurants providing advertisement information regarding seasonal menu items and locations. In some embodiments, the content provider may be a realtor providing information about available property for sale or rent. Other examples may include retail stores, amusement parks, etc. providing advertisements about their locations. In addition, the mapping server 440 may include data from other users, traffic reports, weather reports, police reports, and/or any other source of relevant information. The POI server 445 may include reviews of POIs, details about POIs and/or any other relevant information. The mapping server 440 and/or the POI server 445 may process the information for display on the user device 410.

Each server in the system of servers 435, including mapping server 440, POI server 445, and UI server 450 may each represent any of various types of servers including, but not limited to a web server, an application server, a proxy server, a network server, or a server farm. Each server in the system of servers 435 may be implemented using, for example, any general-purpose computer capable of serving data to other computing devices including, but not limited to, user devices 410 (including mobile device 415, GPS device 420 and computer 425) or any other computing device (not shown) via network 405. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid-state disk (SSD) or flash memory; optical disc storage; or magneto-optical disc storage. Software may include one or more applications and an operating system. Hardware can include, but is not limited to, a processor, memory, and graphical user interface display. Each server may also have multiple processors and multiple shared or separate memory components that are configured to function together within, for example, a clustered computing environment or server farm.

In an example, each of user devices 410 may be configured to execute a mobile client application for providing various functions of a mapping service hosted at mapping server 440. Examples of such functions may include, but are not limited to, viewing and manipulating digital maps, route planning and navigation, and obtaining information related to various POIs. Such POIs may include, for example and without limitation, landmarks, buildings, public parks, museums, restaurants, gas stations, retail stores, cafes, or any other predefined geographic location associated with a public or private enterprise. The client application executable at each user device 410 may be configured to process and execute instructions and save data in memory. The client application may also be configured to provide the various mapping functions to the user through a GUI, such as GUI 100 presented via a display, e.g., capacitive touch-screen display, coupled to each user device 410. The client application executable at each user device may be a standalone mobile application or may be configured to execute within, for example, a web browser based on web page data loaded within the browser or similar application executable at each of user devices 410.

In a further example, the above-described mapping client application and/or mapping service hosted at mapping server 440 may be configured to communicate with POI server 445 over network 405 for purposes of sending and receiving information related to exits located along a highway and the POIs associated with each exit. Each of mapping server 440 and POI server 445 may be communicatively coupled to, for example, an exit POI database 470 which may be used to store a mapping of intersections or highway exits and associated POIs. The POIs associated with an exit may include, for example, POIs that may be located within a predetermined distance or radius of the exit or within a specified travel time from the exit.

As will be described in further detail below, such an exit POI database 470 may be used (e.g., by POI sever 445 and/or mapping server 440) to store and retrieve data related to a particular intersection or highway exit. The data associated with an exit may include, for example, a convenience ranking for each exit.

To implement navigation features of the mobile application, each user device 410 may receive location data from one or more servers in the system of servers 435 via network 405 and/or satellites 455. Such location data may include information regarding a user's trip, such as a start or origin location, travel route, and a destination location. The mobile application may be any machine-readable code for executing instructions, such as software, configured to be processed by each user device 410. The mobile application may have been downloaded via the network 405 and installed within a memory of each user device 410.

Figure 5:
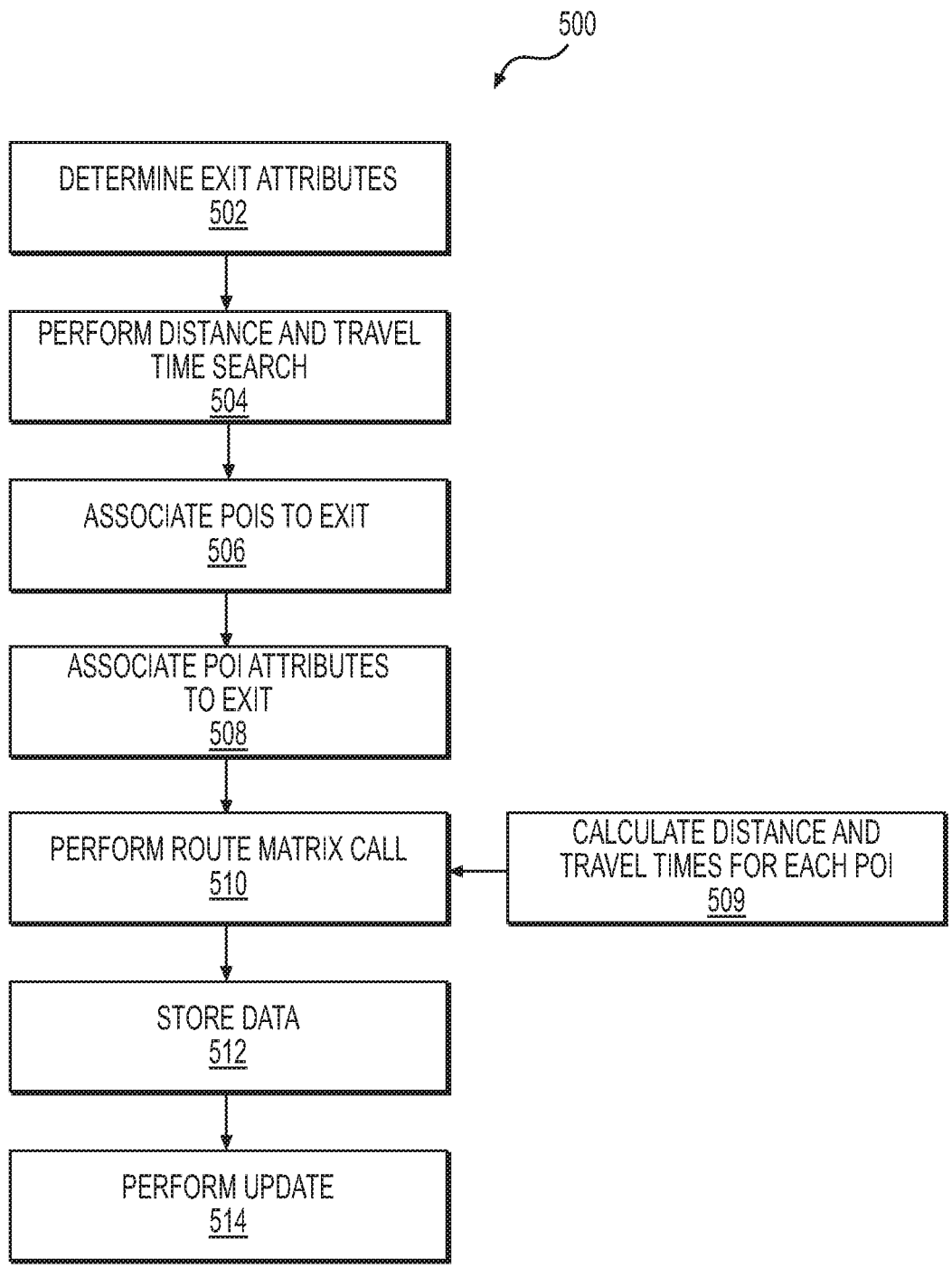
FIG. 5 is a flow diagram of an exemplary method of automatically associating POIs with intersections and exit locations along a route for storage in an electronic database, according to an exemplary embodiment of the present disclosure.

FIG. 5 is a flow diagram of an exemplary method 500 of automatically electronically generating and associating POIs to intersections/exit locations for storage in an electronic database, which may be accessed for quick retrieval of POI data. For example, method 500 may be used to populate each matrix 305 with POI information.

In one embodiment, method 500 may include a step 502 of determining attributes of intersections/exits. Examples of intersection/exit attributes may include, type (exit, rest/service area, truck stop, etc.), geographic location of the intersection/exit (GPS co-ordinates, latitude, and longitude), intersection/exit number/name, direction of the exit, exit branch information, length of exit ramp, user ratings, popularity, convenience ratings, etc. Based on the geographic location of each intersection/exit, a search may be performed for POIs within a predetermined distance or travel time from each intersection exit at step 504.

At step 504, the predetermined distance may be any suitable distance and may be a radius from the exit location. Alternatively, the predetermined distance may be measured as an estimate of travel time from the intersection/exit location. One or more servers, such as POI servers 445 and/or other servers having POI information may be accessed and the information processed by POI servers 445 to identify POIs within the predetermined distance. In some embodiments, the predetermined distance/travel time may be the same for each intersection/exit along the route. In other embodiments, the predetermined travel time/distance may be automatically adjusted (increased or decreased) based on the number of POIs identified using the predetermined distance. For example, if no POIs are identified within a predetermined travel time of 10 minutes of a first exit in a rural location, the predetermined distance may be incrementally increased to identify a POI until a maximum distance is reached. The maximum travel time and incremental travel time may be predetermined or based on user input. In another example, if many POIs are identified within a predetermined travel time of about 10 minutes of an exit, for example, in a large city, the predetermined travel time may be decreased (e.g. by increments of 2 minutes).

At step 506, the POIs identified as being within the predetermined distance or travel time from the intersection/exit location may be associated with the respective exit in any suitable manner. For example, a record of the POI may be generated, saved in memory, and linked to the corresponding exit, such that later retrieval of the POI or exit from the memory may indicate the association.

At step 508, attributes of each POI associated with an exit location may be determined and associated with the POI in any suitable manner. For example, a gas station, restaurant, and hotel may be associated with an exit and the exit may be saved in memory as having attributes of having fuel, food, and lodging services. In addition, information about the POI may be associated with the exit. For example, the name, address, phone numbers, website, category information, travel time from the exit location to the POI, etc.

At step 510, a route matrix call may be performed from each intersection/exit location to each of the associated POIs to determine attributes of the associated POIs. For example, at step 509, the distance and travel times from each intersection/exit to each associated POI may be determined such that each intersection/exit has a matrix 305 of associated POIs with travel time/distance data.

At step 512, data determined in step 510 may be stored in memory for later retrieval. For example, by a user device to provide quick processing. At step 514, steps 504-512 may be repeated to update information e.g. changes in fuel prices, user reviews, weather conditions.

In some embodiments, the POI data may be accessed (e.g. by mapping sever 440) during a route calculation between a start location and a destination location received from a user. The route may be identified as being equal to or above a predetermined distance threshold for providing POI information for exits along the route. The predetermined distance threshold for providing POI information may be any suitable distance set by the mapping service or the user, such as 100 miles, 200 miles, 800 miles, one hour, two hours, four hours, eight hours, etc.

In some embodiments, the predetermined distance threshold may be indicative of a road trip type trip (e.g. over 100 miles or above a 2 hour drive, etc., or any type of trip for which a user may plan stops or breaks. In this example, the start and destination locations along with any user-inputted parameters may be processed by the mapping/routing server and the route may be calculated. Based on the route calculated, a route may be generated and displayed on the user device 410. The generated route may be displayed on the electronic device along with various map and route display-manipulating tools. For example, the manipulating tools may include a scroll bar or icon for viewing various portions of the map and/or a zoom icon to zoom in and out of the map.

Figure 6:
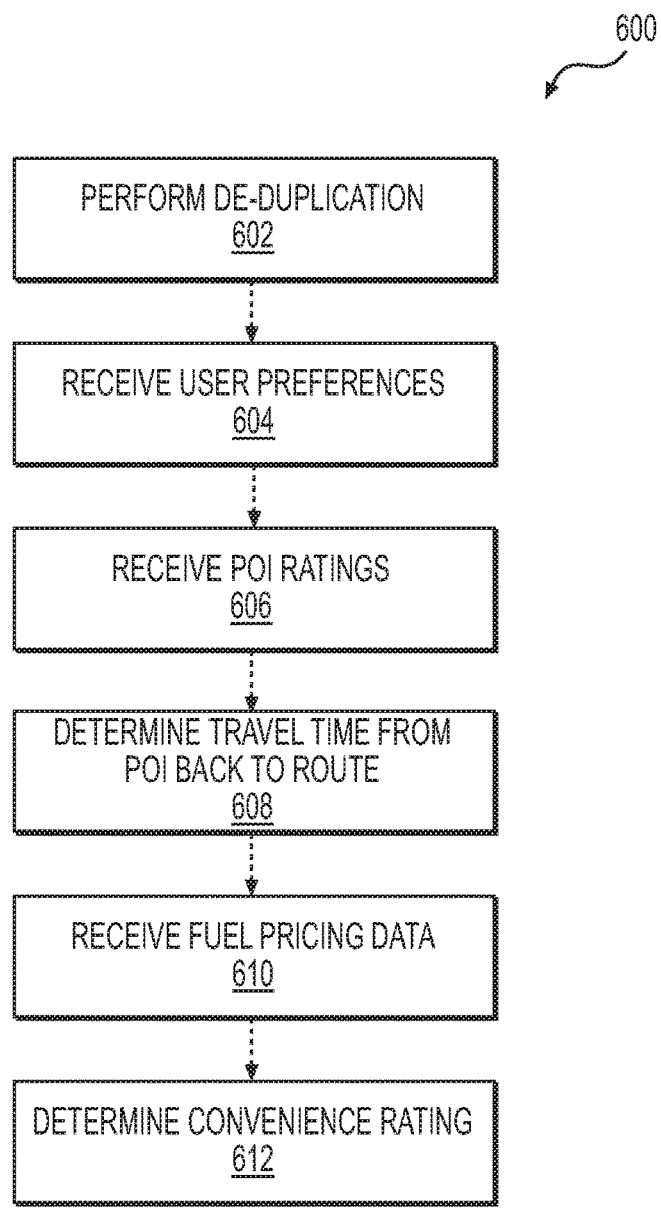
FIG. 6 is a diagram of exemplary steps for associating POIs with exit locations, according to an exemplary embodiment of the present disclosure.

Following calculation of the route, the exit attributes may be electronically retrieved from any suitable source, such as mapping servers 440, external mapping providers, etc., in any suitable manner, for example over a network 405, Referring now to FIG. 6, illustrated are exemplary steps 602-612, collectively referred to as 600 for associating POIs with exit locations for storage in the electronic POI database. At step 602 de-duplication may be performed by first determining if any POI is indicated in the distance/travel time search for multiple exits and only associating the POI with the closest exit such that no POI is associated with multiple exits.

At steps 606-610, various POI attributes may be determined. For example, at step 606 the POI ratings, such as customer ratings, may be retrieved. At step 608, travel time from a POI back to the route may be determined. At step 610, fuel pricing information data may be determined. The information received in steps 606-610 and/or any other POI attribute information may be used to calculate a convenience rating for each POI at step 612. The convenience rating for each POI may be stored in the electronic database. Any data generated from any or any combination of steps 602-612 may be used as input to the route matrix call at step 510.

The following are examples of accessing the pre-calculated POI database.

EXAMPLE 1

A user accesses a mapping website via a computer connected to the Internet, enters Dallas, Tex. as a start location and Baltimore, Md. as an end location, and requests a route from the mapping website. The user request is processed and the website displays three alternate routes with a summary of the major portions of each route. The user selects one of the routes, which includes travel along a highway. In response to the user selection, the length of the route is identified as being above a predetermined threshold for a route along which a user may desire to exit the highway at POI. The user is then prompted to add any preferences for POIs along the route. The user selects gas stations and drive-thru restaurants at exits along the route. The website accesses the POI database pre-calculated POI information, processes the request, and displays the step-by-step directions of the route and exits along the route identified as having gas stations and drive-thru restaurants within a pre-determined distance from the exit location. Each of the identified gas station and drive-thru restaurants may be associated with a single exit and a convenience rating for each exit may be calculated and displayed on the website. The exits may be displayed on the website in the order of the exits along the route in the direction of travel to the destination location. The respective identified POIs associated with each exit may be displayed next to the corresponding exit in order of shortest to longest distance from the exit location.

EXAMPLE 2

A user accesses a mapping website via a mapping application on a mobile electronic device having a GPS transmitter and being connected to the Internet. The user enters Chicago, Ill. as an end location and requests a route from the present location detected by the GPS as New York City, N.Y. The user request is processed and the website displays three alternate routes with a summary of the major portions of each route and an option of calculating estimated fuel costs for each route. The user selects one of the routes, which includes travel along a highway and requests a calculation of the estimated fuel cost of the trip. The user is then prompted enter the type, year, and model of the vehicle to be used along the route. In response to the user selection, the estimated fuel cost is calculated and displayed. In addition, the length of the route is identified as being above a predetermined threshold for a route along which a user may desire to exit the highway at a POI. The user is then prompted to add any preferences for POIs along the route.

The user selects gas stations with a gas price of equal to or less than $3.50/gallon. The website accesses the POI database of pre-calculated POI data, processes the request and displays the step-by-step directions of the route and exits along the route identified as having gas stations with a gas price of equal to or less than $3.50. Each of the identified gas stations may be associated with a single exit.

Although intersections and highway exits are used above as examples, the disclosed methods and systems may be used with any junction or combination of junctions.

Figure 7:
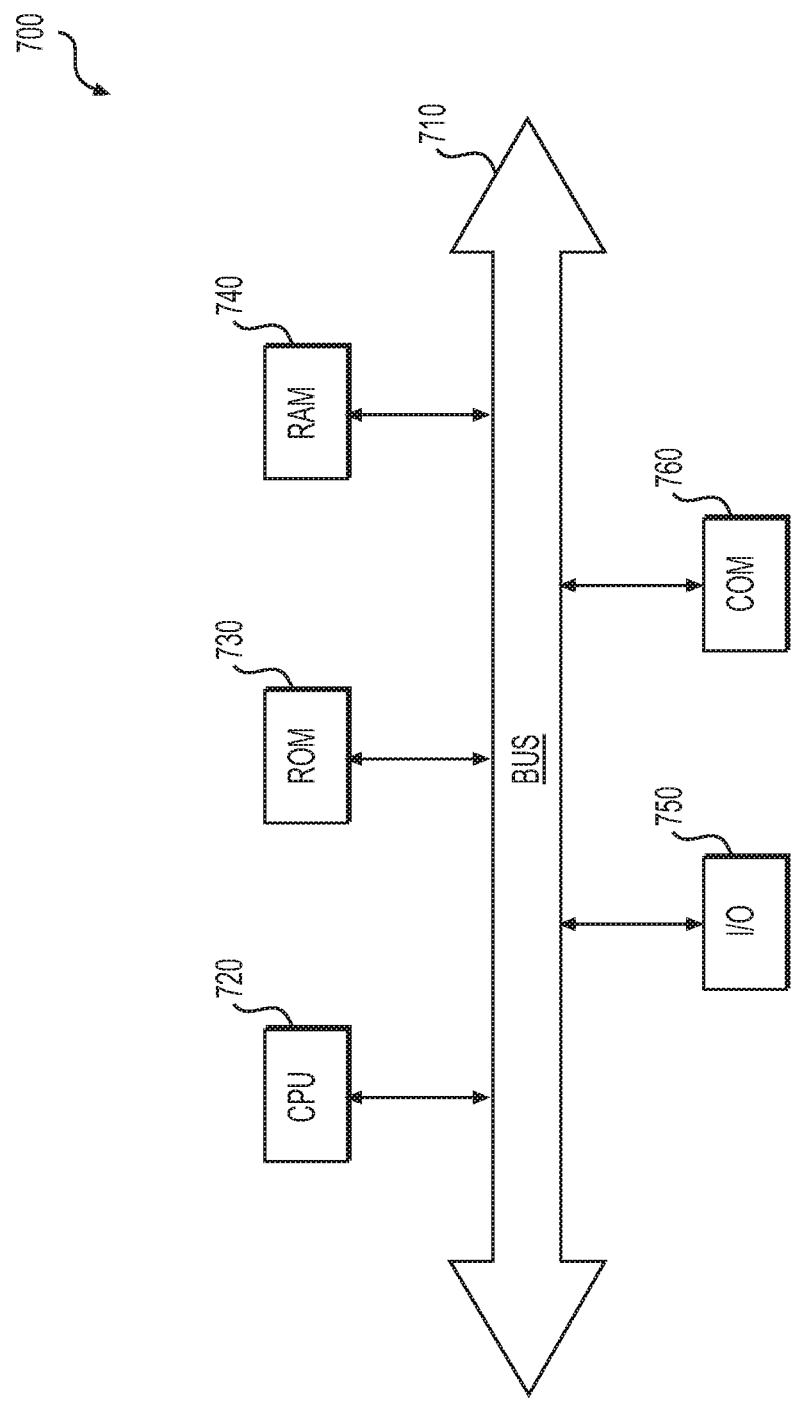
FIG. 7 is a simplified functional block diagram of a computer that may be configured as a host server, for example, to function as a mapping server.

FIG. 7 provides a functional block diagram illustration of general-purpose computer hardware platforms. FIG. 7 illustrates a network or host computer platform 700, as may typically be used to implement a server like the mapping server system 440. It is believed that those skilled in the art are familiar with the structure, programming, and general operation of such computer equipment and as a result, the drawings should be self-explanatory.

A platform for a server or the like 700, for example, may include a data communication interface for packet data communication 760. The platform may also include a central processing unit (CPU) 720, in the form of one or more processors, for executing program instructions. The platform typically includes an internal communication bus 710, program storage, and data storage for various data files to be processed and/or communicated by the platform such as ROM 730 and RAM 740, although the server 700. The hardware elements, operating systems, and programming languages of such equipment are conventional in nature, and it is presumed that those skilled in the art are adequately familiar therewith. The server 700 also may include input and output ports 750 to connect with input and output devices such as keyboards, mice, touchscreens, monitors, displays, etc., and communication ports 760. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for providing point of interest (POI) information to a user, the computer system comprising:
a memory having processor-readable instructions stored therein; and
a processor configured to access the memory and execute the processor-readable instructions, which when executed by the processor configures the processor to perform a plurality of functions, including functions to:
identify a plurality of points of interest (POIs) within a pre-determined travel time or a predetermined travel distance from one or more intersections or highways exits, and determine a POI category of each of the plurality of POIs;
associate each of the plurality of POIs and its respective determined POI category with a closest one of the one or more intersections or highway exits; and
determine a rating of each intersection or highway exit of the one or more intersections or highway exits based on:
a number of different POI categories associated with each intersection or highway exit of the one or more intersections or highway exits, and pre-calculated POI data stored in an electronic database.

2. The computer system of claim 1, wherein the plurality of functions performed by the processor when executing the processor-readable instructions further includes functions to determine one or more attributes of the intersection or highway exit.

3. The computer system of claim 2, wherein the one or more attributes of the intersection or highway exit comprises a type of intersection or highway exit.

4. The computer system of claim 3, wherein the rating for each intersection or highway exits of the one or more intersections or highway exits is further based on a shortest travel time from each of the plurality of associated POIs to each intersection or highwar exit of the one or more intersections or highway exits.

5. The computer system of claim 1, wherein the one or more intersections or highwar exits is a plurality of intersections or highway exits, and each of the plurality of POIs is associated with a single one of the plurality of intersections or highway exits.

6. The computer system of claim 1, wherein the rating is further determined based on user submitted ratings.

7. The computer system of claim 1, further wherein the pre-determined travel time is received from the user.

8. The computer system of claim 1, wherein the plurality of functions performed by the processor when executing the processor-readable instructions further includes functions to:
- determine a plurality of attributes of each of the plurality of POIs;
- calculate a travel time and a travel distance of each of the plurality of POIs from the closest one of the one or more intersections or highway exits; and
- store the plurality of attributes of each of the plurality of POIs, the travel time from the one or more intersections or highway exits, the travel distance from the one or more intersections or highway exits, and determined POI category in association with each of the plurality of POIs in the electronic database, as the pre-calculated POI data, said pre-calculated POI data being retrievable for route planning purposes such that later retrieval of the pre-calculated POI data for any point along a designated route indicates the association between the one or more intersections or highway exits and respective POIs associated therewith.

9. The computer system of claim 8, wherein the plurality of functions performed by the processor when executing the processor-readable instructions further includes functions to:
- receive, from an electronic device of the user and over a network, user input data including at least a destination location,
- generate a route from a start location to the destination location on a digital map based on the user input data, at least a portion of the route comprising one or more intersections or highways,
- retrieve, from the electronic database, the pre-calculated POI data, and
- display, on the electronic device of the user, the route, and the pre-calculated POI data.

10. The computer system of claim 8, wherein user input data comprises one or more POI categories.

11. The computer system of claim 8, wherein the plurality of functions performed by the processor when executing the processor-readable instructions further includes functions to update the electronic database based on the travel time and the travel distance from the one or more intersections or highway exits to each of the plurality of POIs.

12. The computer system of claim 8, wherein the plurality of functions performed by the processor when executing the processor-readable instructions further includes functions to dynamically receive variable data related to each associated POIs.

13. The computer system of claim 12, wherein the electronic database comprises the pre-calculated POI data related to each of the associated POIs.

14. The computer system of claim 12, wherein the variable data includes at least one of:
- fuel prices, or
- hotel room rates.

15. A computer-implemented method for providing point of interest (POI) information to a user, the method comprising:
- identifying a plurality of points of interest (POIs) within a pre-determined travel time or predetermined travel distance from one or more intersections or highways exits, and determine a POI category of each of the plurality of POIs;
- associating each of the plurality of POIs and a respective determined POI category with a closest one of the one or more intersections or highway exits; and
- determining a rating of each intersection or highway exit based on:
  - a number of different POI categories associated with the one or more intersections or highway exits; and
  - pre-calculated POI data stored in an electronic database.

16. The method of claim 15, wherein the rating for each of the one or more intersections or highway exits is further based on a shortest travel time from each of the plurality of associated POIs to each of the one or more intersections or highway exits.

17. The method of claim 15, further comprising:
- determining a plurality of attributes of each of the plurality of POIs;
- calculating a travel time and a travel distance of each of the plurality of POIs from the closest one of the one or more intersections or highway exits; and
- storing the plurality of attributes of the plurality of POIS, the travel time from the one or more intersections or highway exits, the travel distance from the one or more intersections or highway exits, and determined POI category in association with each of the plurality of POIs in the electronic database, as the pre-calculated POI data, said pre-calculated POI data being retrievable for route planning purposes such that later retrieval of the pre-calculated POI data for any point along a designated route indicates the association between the one or more intersections or highway exits and respective POIs associated therewith.

18. The method of claim 17, further comprising:
- receiving, from an electronic device of the user and over a network, user input data including at least a destination location,
- generating a route from a start location to the destination location on a digital map based on the user input data, at least a portion of the route comprising one or more intersections or highways,
- retrieving, from the electronic database, the pre-calculated POI data, and
- displaying, on the electronic device of the user, the route, and the pre-calculated POI data.

19. The method of claim 15, wherein the rating is further determined based on user submitted ratings.

20. The method of claim 15, further comprising:
- dynamically receiving variable data related to each associated POIs, wherein the variable data includes at least one of:
- fuel prices, and
- hotel room rates.

* * * * *